US008055982B2

(12) United States Patent
Mulligan

(10) Patent No.: US 8,055,982 B2
(45) Date of Patent: Nov. 8, 2011

(54) ERROR CORRECTION SYSTEM AND METHOD

(75) Inventor: Daniel Mulligan, Austin, TX (US)

(73) Assignee: Sigmatel, Inc., Austin, TX (US)

(*) Notice: Subject to any disclaimer, the term of this patent is extended or adjusted under 35 U.S.C. 154(b) by 965 days.

(21) Appl. No.: 12/016,577

(22) Filed: Jan. 18, 2008

(65) Prior Publication Data

US 2008/0201625 A1 Aug. 21, 2008

Related U.S. Application Data

(60) Provisional application No. 60/902,583, filed on Feb. 21, 2007.

(51) Int. Cl.
*H03M 13/00* (2006.01)
(52) U.S. Cl. ........ 714/784; 714/746; 714/751; 714/752; 714/756; 714/781; 714/764; 714/773; 714/774; 714/758
(58) Field of Classification Search ..................... None
See application file for complete search history.

(56) References Cited

U.S. PATENT DOCUMENTS

| | | | |
|---|---|---|---|
| 5,956,743 A | 9/1999 | Bruce et al. | |
| 6,615,387 B1* | 9/2003 | Williamson et al. | 714/785 |
| 6,802,039 B1 | 10/2004 | Quach et al. | |
| 6,894,944 B2 | 5/2005 | Ishibashi et al. | |
| 6,904,492 B2* | 6/2005 | Hogan | 711/102 |
| 7,231,585 B2 | 6/2007 | Vainsencher et al. | |
| 7,397,400 B2* | 7/2008 | Miller | 341/67 |
| 7,533,319 B2* | 5/2009 | Hwang et al. | 714/746 |
| 7,539,919 B2* | 5/2009 | Hwang et al. | 714/752 |
| 7,779,336 B2* | 8/2010 | Wenger et al. | 714/776 |
| 7,870,456 B2* | 1/2011 | Hwang et al. | 714/746 |
| 2005/0120265 A1 | 6/2005 | Pline et al. | |
| 2005/0125708 A1 | 6/2005 | Simon | |
| 2005/0146613 A1 | 7/2005 | Silverbrook et al. | |
| 2005/0172207 A1 | 8/2005 | Radke et al. | |
| 2007/0245215 A1* | 10/2007 | Hwang et al. | 714/758 |
| 2008/0008155 A1* | 1/2008 | Yoon et al. | 370/349 |
| 2008/0063366 A1* | 3/2008 | Sako et al. | 386/95 |

OTHER PUBLICATIONS

"Creating and Decoding Reed-Solomon Codes," http://www.mathworks.com/access/helpdesk_r13/help/toolbox/comm/tutor125.html#7360, printed Mar. 6, 2008, 3 pages, The Mathworks, Inc.

(Continued)

*Primary Examiner* — John Trimmings
(74) *Attorney, Agent, or Firm* — Toler Law Group

(57) ABSTRACT

A method includes receiving payload data from a data source at error correction code (ECC) logic, where the ECC logic is adapted to process a block of data of a particular size via a plurality of stages. The ECC logic is initialized to a selected stage of the plurality of stages. The selected stage includes an initial value and an initial number of cycles. The initial value and the initial number of cycles are related to a number of symbols of padding data corresponding to a difference in size between the payload data and the block of data. The selected stage is related to a state of the ECC logic as if the number of symbols of padding data had already been processed by the ECC logic. The payload data is processed via the ECC logic beginning with the selected stage to produce parity data related to the payload data.

24 Claims, 3 Drawing Sheets

OTHER PUBLICATIONS

"Reed-Solomon error correction," http://en.wikipedia.org/wiki/Reed-Solomon_error_correction, page last modified on Feb. 25, 2008, printed Mar. 7, 2008, 6 pages, Wikipedia.

Benjamin, H. and B. Kamali, "Selection of the most 'efficient' shortenedReed-Solomon code from a neural network database," http://ieeexplore.ieee.org/Xplore/login.jsp?url=ie15/7084/19158/00886682.pdf?arnumber=886682, summary of pp. 390-393, vol. 1., 2000, Vehicular Technology Conference, printed Mar. 7, 2008, 1 page.

"Reed-Solomon Codes," http://www.4i2i.com/reed_solomon_codes.htm, printed Mar. 7, 2008, 6 pages, 4i2i Communications Ltd, 2004.

"Reed-Solomon Encoder," http://www.altera.com/products/ip/dsp/error_detection_correction/m-amp-rs-enc.html, printed Mar. 7, 2008, 2 pages, Altera Corporation, San Jose, California, USA.

Redinbo, G.R., L.M. Napolitano, Jr., and D.D. Andaleon, "Multibit Correcting Data Interface for Fault-Tolerant Systems," http://portal.acm.org/citation.cfm?id=626738&jmp=cit&coll=GUIDE&dl=GUIDE, abstract from IEEE Transactions on Computers, Apr. 1993, pp. 433-446, vol. 42, Issue 4, IEEE Computer Society, Washington DC, USA, printed Mar. 7, 2008, 3 pages.

* cited by examiner

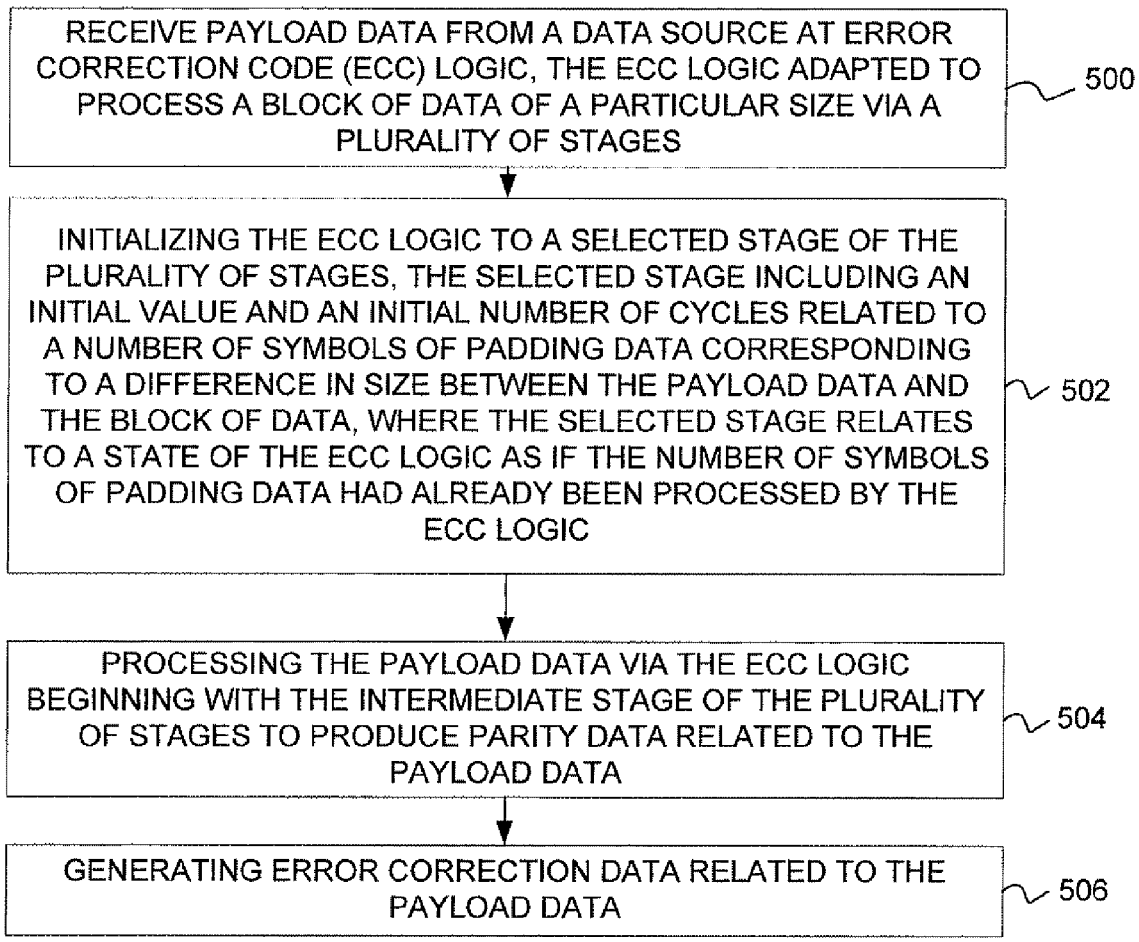

ERROR CORRECTION SYSTEM AND METHOD

CLAIM OF PRIORITY

This application claims priority from U.S. Provisional Patent Application No. 60/902,583, entitled "ERROR CORRECTION SYSTEM AND METHOD", filed on Feb. 21, 2007, which is incorporated herein by reference in its entirety.

FIELD OF THE DISCLOSURE

The present disclosure is generally related to error correction systems and methods.

BACKGROUND

Data reliability is a problem in the telecommunications and mass storage fields, where wireless transmissions are susceptible to errors due to signal degradation and where mass storage media routinely encounter read or write errors. In general, the mass storage media may include hard disks, NAND and NOR flash memory, and other types of non-volatile memory. To improve data reliability, Error Correction Code (ECC) algorithms have been developed to detect and to correct bit errors within blocks of data. ECC algorithms typically include the transmission or storage of redundant data, which does not convey information.

"Hamming Codes" refer to a class of ECC algorithms that can be used to detect and correct data errors. Hamming codes are widely used for error detection and correction in digital communications systems and in data storage systems. Another well-known ECC algorithm is the "Reed-Solomon code", widely used for error correction in the hard drive and compact disk industries. The Reed-Solomon codes may be used to correct multiple errors per block of data.

Generally, when a block of data is to be written to a memory or transmitted over a communication channel, an ECC engine calculates parity data based on the data. Both the data and the associated parity data are written to the memory or transmitted over the communication channel. When the data is accessed from the memory or received from the communication channel, the ECC engine calculates parity data based on the accessed data, and compares the calculated parity data to the stored parity data. If a difference is detected, the ECC engine determines which bits are in error and may take steps to correct the bits or flag the errors to the rest of the system so as to initiate an error recover mechanism like requesting a retransmission over the communication channel or rereading the data from the memory.

Generally, the ECC algorithms are designed to operate on a block of data of a particular size. When a block of data that is stored in a mass storage device does not match the particular size, padding bits or padding data are often appended to the payload data to produce a block of data of the right size for the ECC algorithm. Since the padding data is added before the ECC process, the padding data adds to the number of cycles and the processing time required to decode the data.

BRIEF DESCRIPTION OF THE DRAWINGS

FIG. 4 is a flow diagram of a method of initializing a state machine based on padded data; and FIG. 5 is a flow diagram of a method of processing payload data using an initialized state machine according to the method of FIG. 4.

DETAILED DESCRIPTION

Figure 1:
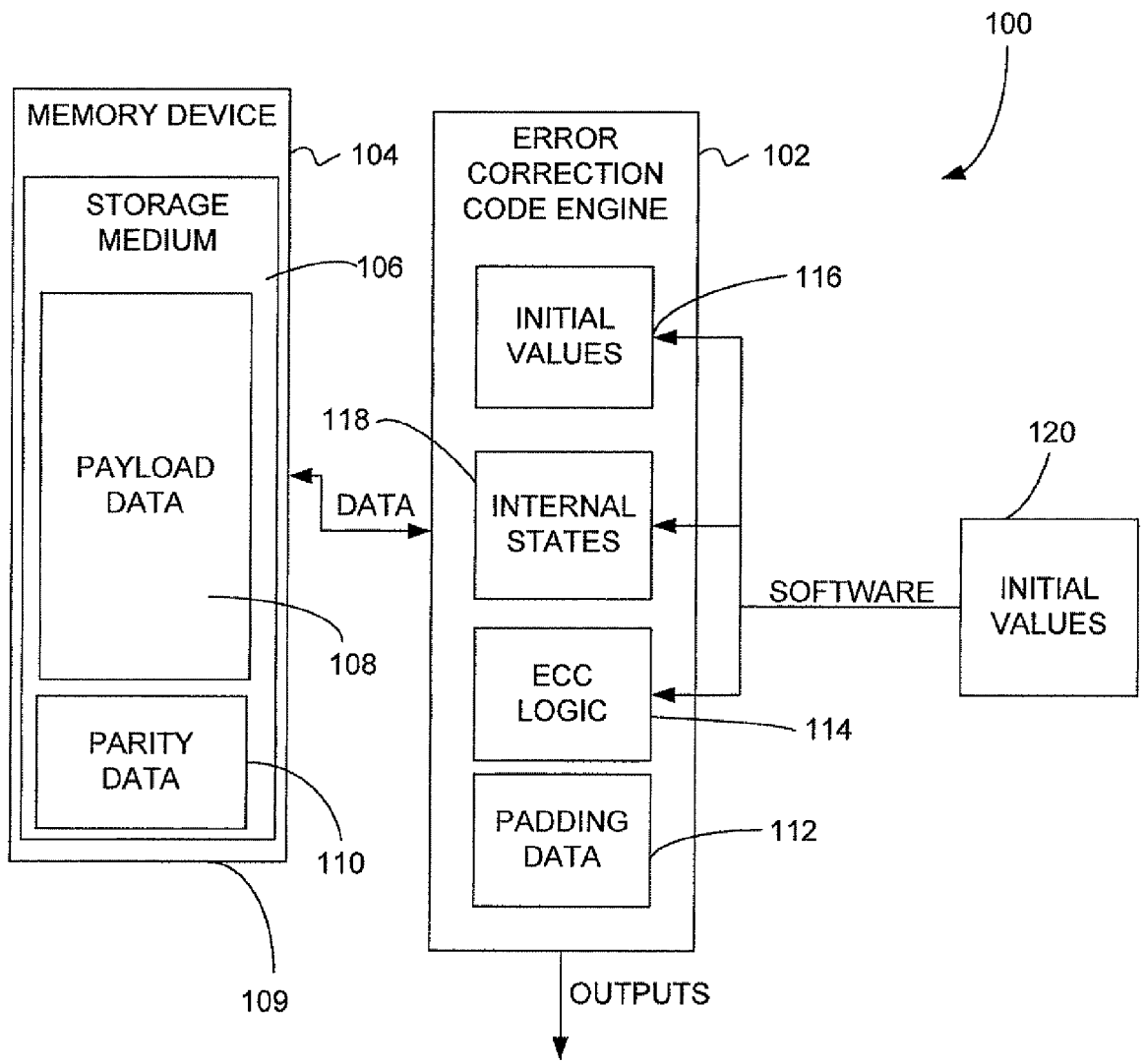
FIG. 1 is a general diagram of an embodiment of a system to perform error correction on data retrieved from a memory.

In one particular embodiment, a method includes receiving payload data from a data source at error correction code (ECC) logic, where the ECC logic is adapted to process a block of data of a particular size via a plurality of stages. The ECC logic is initialized to a selected stage of the plurality of stages. The selected stage includes an initial value and an initial number of cycles. The initial value and the initial number of cycles are related to a number of symbols of padding data corresponding to a difference in size between the payload data and the block of data. The selected stage is related to a state of the ECC logic as if the number of symbols of padding data had already been processed by the ECC logic. The payload data is processed via the ECC logic beginning with the selected stage to produce parity data related to the payload data.

In another particular embodiment, an error correction code (ECC) engine includes a memory and error correction code (ECC) logic. The error correction code (ECC) logic processes a data block via a plurality of stages including an initial stage and the intermediate stage. The ECC logic receives payload data from a data source, reads a value and a number of cycles from the memory, and processes the payload data starting from the intermediate stage. The payload data is smaller than the data block by a number of symbols, and the value and the number of cycles relate to a number of cycles of the ECC logic to process the number of symbols.

In still another particular embodiment, a method includes receiving payload data and associated parity data from a data source, where the payload data has a size that is smaller than a desired size of a data block. The method includes initializing error correction code (ECC) logic to an intermediate state value and an intermediate number of cycles related to a difference between a size of the payload data and the desired size of the data block, processing the payload data using the ECC logic to produce processed parity data, and comparing the processed parity data to the associated parity data.

In yet another particular embodiment, a processor readable medium embodies processor readable instructions to perform error detection and correction on payload data using associated parity data. The processor readable instructions include instructions to initialize error correction code (ECC) logic to an intermediate value and an intermediate number of cycles in response to receiving payload data from a data source, where the ECC logic processes a data block of a desired size using a plurality of stages. The processor readable instructions also include instructions to calculate parity data for the payload data using the ECC logic, where the intermediate value and the intermediate number of cycles relate to a state of the ECC logic after processing a number of symbols of padding data related to a difference between the desired size of the data block and a size of the payload data.

In another particular embodiment, a method includes receiving payload data at error correct code (ECC) logic that is adapted to process a data block of a particular number of symbols. A difference is determined between a number of symbols of the payload data and the particular number of symbols of the data block. An intermediate stage is selected from a plurality of stages, where each stage of the plurality of stages corresponds to a value and a number of cycles of the ECC logic after processing a number of symbols of padding data corresponding to the difference. The payload data is processed using the ECC logic initialized to the selected intermediate stage.

FIG. 1 is a block diagram of a particular embodiment of a system 100 to perform error correction on data retrieved from a memory. The system 100 includes an error correction code (ECC) engine 102 and a memory device 104. The memory device 104 includes a storage medium 106 including payload data 108 and associated parity data 110. The ECC engine 102 includes padding data 112, ECC logic 114, initial values 116, and internal states 118. The ECC engine 102 may be configured to receive externally provided initial values 120 via software to initialize the initial values 116 and the internal states 118.

In operation, the ECC engine 102 receives data, including the payload data 108 and the parity data 110, from the memory device 104. The ECC engine 102 receives padding data 112 in front of the payload data 108 to form a data block of a particular size for processing by the ECC logic 114 using an ECC process, such as a Reed-Solomon ECC process. In practice, the padding data 112 may not be included. Instead, the ECC logic 114 may operate on the payload data 108 as if the padding data 112 were part of the payload 108 and as if the padding data 112 had already been processed If the padding data 112 is added, the ECC engine 102 skips processing of the padding data 112 and processes the payload data 108 of the data block starting from an intermediate state of the ECC process. The ECC logic 114 is initialized to the intermediate state defined by the initial values 116 and the internal states 118, as if the padding data 112 were already processed by the ECC logic 114.

Since the size of the blocks of data associated with read and write operations from and to a data source may be different than the size of the blocks of data associated with an error correction code engine, the block of data from the memory 104 may be padded before it is presented to the error correction code engine 102. It should be understood that the data source may be a non-volatile memory, such as a flash memory, a hard disk drive, a tape drive, a mass storage device, other non-volatile memory devices, or any combination thereof. Alternatively, the data source may be a volatile memory, such as random access memory(RAM), which may include dynamic RAM (DRAM), synchronous dynamic random access memory (SDRAM), double data rate (DDR) SDRAM, static RAM (SRAM), other random access memories, or any combination thereof, for use in a high reliability product. In another embodiment, the data source may be a communication channel.

In general, the initial values 120 and/or the initial values 116 and the internal states 118 are determined by processing a number of symbols of the padding data 112. In particular, depending on the ECC process used, such as Hamming Codes, Reed Solomon Codes, and the like, the number of symbols of the data block needed by the ECC engine 102 may vary. Accordingly, the ECC engine 102 is adapted to add padding symbols (padding data 112) in front of the payload data 108 to produce a block of data having the desired number of symbols. However, since the padding data 112 is known, the initial values 116 and the internal states 118 of the ECC logic 114 as determined after processing the padding data 112 is also known for each payload. In other words, the padding data 112 may be processed once using the ECC logic 114, and the state machine values 116 and internal states 118 of the ECC logic 114 are stored for later use. Subsequently, for each data payload 108, the ECC logic 114 processes the payload data 108 starting from an intermediate state corresponding to the state of the ECC logic 114 after processing the padding data 112. For each data payload received, the cycles associated with processing the padding data 112 are saved and power is conserved, since the ECC engine 102 does not need to perform the additional process steps.

In one embodiment, the padding symbols 112 are processed once during the product design process to determine the initial state values 116 and the internal states 118, which may be written to a read only memory (ROM) or to a non-volatile memory of the ECC engine 102. Alternatively, software may be utilized to configure the initial values 116 and the internal states 118 of the ECC logic 114.

In a particular embodiment, the ECC engine 102 may be adapted to perform error detection and correction using Reed-Solomon codes. A Reed-Solomon ECC engine 102 may not have separate encode and decode components. Instead, the Reed-Solomon ECC engine 102 may generate parity bits for both "add ECC protection" and "check ECC protection" processes. During a check ECC protection process, the ECC engine 102 calculates parity data for the payload data 108 or parity data 110, and checks the calculated parity data against stored parity data associated with the payload data. If there is a difference, the ECC engine 102 determines which of the bits of the payload data 108 are in error. During an add ECC protection process, the ECC engine 102 calculates parity data for a set of payload data, and stores the parity data 110 and the payload data 108 in the memory 104. Depending on the particular structure of the memory 104, the parity data 110 may be stored in a redundant memory area 109 that is separate from the payload data 108. In a particular embodiment, the redundant memory area 109 may be adjacent to the payload data 108.

In one particular embodiment, the padding data 112 is not actually added to the payload data 108 to produce a data block of a size needed by the ECC engine 102. Instead, the ECC engine 102 may be initialized as if the padding data 112 were added. The ECC engine 102 may process the payload data 108 starting from an intermediate stage or state, as if the padding data 112 had been added to the payload data 108 and had already been processed.

Figure 2:
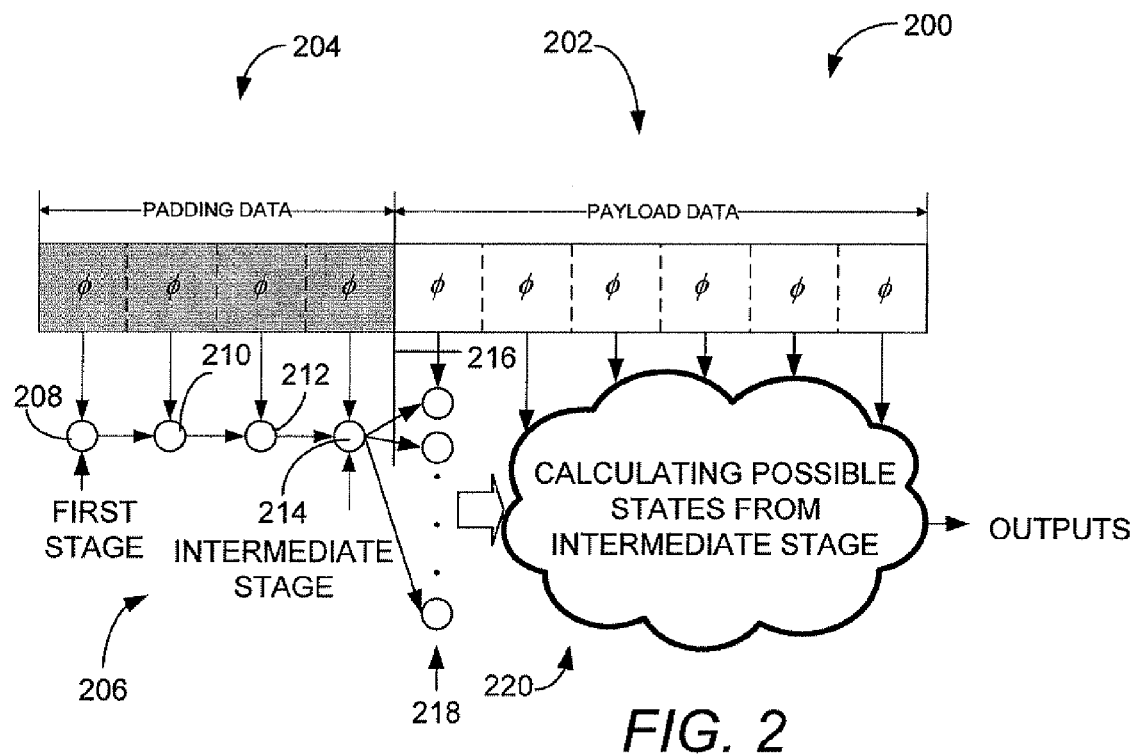
FIG. 2 is a general diagram illustrating ECC decoding by processing data bits in a plurality of stages beginning with an intermediate stage.

FIG. 2 is a general diagram 200 illustrating ECC decoding by processing data bits in a plurality of stages beginning with an intermediate stage. The diagram 200 includes a set of payload data 202, a set of padding data 204, and a set of illustrative states 206. In general, the set of payload data 202 includes data bits of interest for error detection and correction. The padding data 204 includes padding bits that were added in front of the set of payload data 202 to produce a data block of a particular size for the ECC engine 102. The padding data 204 and the payload data 202 are subdivided to reflect stages of the processing from a first stage 208 to an intermediate stage 214, and so on.

During a product design stage or during initialization of the ECC engine, the set of padding data 204 may be processed by ECC logic 114 to determine the initial values 116 and internal states 118 of the ECC logic 114, starting from a first state 208 and proceeding through states 210, 212, and 214. When the padding data has been processed, the values of the ECC logic 114 are stored as the initial values 116 and the state or stage of the process may be stored as the initial states 118.

During operation, the ECC logic 114 is initialized to an intermediate stage 214, which corresponds to the initial values 116 and to the internal states 118 after the padding data 204 is processed. When payload data 202 is received, the payload data 202 is processed starting from the intermediate stage 214. For example, if each of the symbols of the padding data 204 is 10-bits, the first stage 208 includes $2^{10}$ states or 1024 possible bit combinations. The second stage 210 includes $(1024)^2$ possible combinations, and so on. Since the padding data 204 is added by the ECC engine, the values of the padding data 204 are known and the ECC engine can be initialized to the intermediate state 214 corresponding to the initial values and initial states of the ECC engine after processing the padding data 204, without having to actually process the padding data 204 each time the payload data 202 is processed. Thus, the padding data 204 to the left of the starting point 216 can be precalculated, and the initial values and states from the precalculations may be utilized for subsequent processing of the payload data 202. Since the padding data 204 is known, the ECC logic may be initialized to these values without processing the padding data 204, thereby saving clock cycles and conserving power. Moreover, since the padding data 204 is known, the padding data 204 need not be added each time a payload is processed. Instead, the ECC logic may simply operate as if the padding data 204 was present and already processed.

In one aspect, the set of illustrative states 206 can represent a state machine. At each stage, the number of possible states is a function of the bit code. For example, each stage may have $(2^n)^m$ possible states, where n represents a number of bits in a symbol and where m represents a number of stages. At stage five, indicated by reference numeral 218, the number of possible states is $(2^{10})^5$ or $1.15 \times 10^{15}$. Accordingly, each individual bit is processed by the ECC logic through each of the stages, as represented by cloud 220, to produce one or more outputs.

In general, for an n-bit code, symbols are n-bits long. A number of errors (X) may be corrected for a number of symbols ($2^n - 1$) by using $2 \times$ symbols of ECC data. For 10-bit code (1023 symbols of 10 bits each or 1278.75 bytes), correction of two errors uses four ECC symbols (40 bits or 5 bytes). For eight errors, the 10-bit code uses 16 ECC symbols (160 bits or 20 bytes). For a 6-bit code (63 symbols of 6 bits equals 378 bits or 47.25 bytes), correction of two errors uses four ECC symbols (24 bits or 3 bytes), and correction of eight errors uses sixteen ECC symbols (96 bits or 12 bytes).

In one particular embodiment, the ECC engine 102 utilizes a 10-bit Reed-Solomon (RS) ECC code. The 10-bit RS ECC code includes 1023 symbols ($2^{10}$-1 symbols), where each symbol includes 10 bits for a total of 1278.75 bytes (1023 symbols*10 bits/symbol*⅛ bytes/bit). If the ECC engine 102 is adapted to correct up to two errors, four symbols of 10 bits are needed for parity data, leaving 1019 symbols of 10 bits for payload and padding (1273.75 bytes). With a 10-bit RS code, approximately $2^{10}$ (1024) bytes of data are stored, which takes about 819.2 symbols of 10 bits. Thus, a difference between the stored data (819.2 symbols) and the payload and padding data (1019 symbols) leaves approximately 199.8 symbols of padding data. By initializing the ECC logic 114 to an intermediate stage 216, which can be calculated once based on the 199.8 symbols of padding data and reused multiple times, approximately 200 cycles of the ECC logic 114 can be saved each time the payload data is processed.

In general, the states of the ECC logic or of a representative state machine that correspond to the padding data 204 are deterministic, because the contents of the padding data 204 are known. For example, in a particular embodiment, each of the bits of the padding data 204 may be a "one" bit, which may be a default state. In another particular embodiment, each of the bits of the padding data 204 are "zero" bits. The states of the ECC logic or of the representative state machine are initialized to the intermediate stage 214, which corresponds to the states of the ECC logic or the representative state machine as if it had just processed the padding data 204, including the initial state values, the number of cycles, and so on.

It should be understood that the above-discussion assumes that the parity symbols are stored as part of the 1023 symbols. In one particular embodiment, the parity symbols may be stored separately from the 1023 symbols, such as within a redundant data area of the memory. In another particular embodiment, the parity data is stored as part of the 1023 symbols.

Figure 3:
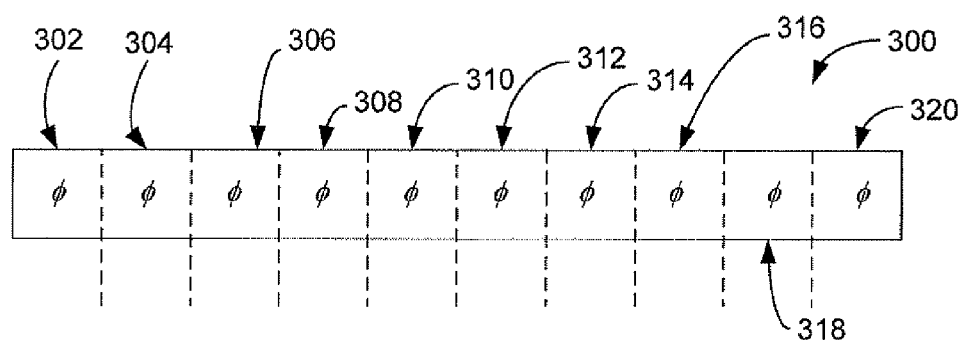
FIG. 3 is a general diagram illustrating a plurality of stages for decoding a block of data beginning with a stage other than the first stage.

FIG. 3 is general diagram 300 illustrating a plurality of symbols (φ) divided into a plurality of stages 302, 304, 306, 308, 310 312, 314, 316, 318, and 320 for decoding. The first stage 302 may include padding data. Depending on the ECC process utilized by the ECC engine, the number of stages that contains padding data may vary. An intermediate stage may be selected as a last stage including the padding data. If stages 302, 304 and 306 include padding data, then stage 306 is the intermediate stage for initializing the ECC engine prior to processing the payload data. Alternatively, if stages 302, 304, 306, 308 and 310 include padding data, then stage 310 would be the intermediate stage for initializing the ECC engine.

FIG. 4 is a flow diagram of a method of initializing a state machine based on padding data. The padding data is processed using error correction code (ECC) logic to determine an initial value and an initial number of cycles related to a number of symbols of padding data needed to add to a block of payload data from a data source to form a block of a particular size for the ECC engine (block 400). The state value and the number of cycles are stored in a memory (block 402).

FIG. 5 is a flow diagram of a method of processing payload data using an initialized state machine according to the method of FIG. 4. The payload data is received from a data source at an error correction code (ECC) logic, where the ECC logic is adapted to process a block of data of a particular size via a plurality of stages (block 500). The ECC logic is initialized to a selected stage of the plurality of stages, where the selected stage includes an initial value and an initial number of cycles related to a number of symbols of the padding data corresponding to a difference in size between the payload data and the block of data, and where the selected stage relates to a state of the ECC logic as if the number of symbols of padding data had already been processed by the ECC logic (block 502). The payload data is processed via the ECC logic beginning with the intermediate stage of the plurality of stages to produce parity data related to the payload data (block 504). Error correction data related to the processed payload data is generated (block 506).

In general, it should be understood that the padding data is placed in front of or before the payload data. The padding data may thus be processed once during the product design process to determine the initial state values and the initial internal states of the ECC logic. Subsequently, the ECC logic may process payload data starting from the initial state values and the initial internal states, as if the padding data were added to the front of the payload data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R.§1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving payload data from a data source at error correction code (ECC) logic, the ECC logic adapted to process a block of data of a particular size via a plurality of stages;
initializing the ECC logic to a selected stage of the plurality of stages, the selected stage including an initial value and an initial number of cycles related to a number of symbols of padding data corresponding to a difference in size between the payload data and the block of data, the selected stage related to a state of the ECC logic as if the number of symbols of padding data had already been processed by the ECC logic; and
processing the payload data via the ECC logic beginning with the selected stage of the plurality of stages to produce parity data related to the payload data.

2. The method of claim 1, wherein the ECC logic comprises a state machine that is initialized based on the initial value and the initial number of cycles.

3. The method of claim 1, further comprising:
receiving parity data from the data source; and
comparing the parity data from the data source to the parity data produced by the ECC logic to perform error checking of the payload data.

4. The method of claim 3, further comprising detecting an error in the payload data and correcting the error using the received parity data.

5. The method of claim 1, wherein the ECC logic uses Reed-Solomon error correction codes.

6. The method of claim 1, further comprising retrieving the initial value and the initial number of cycles from a read only memory.

7. The method of claim 1, further comprising storing the initial value and the initial number of cycles in a memory by hard coding the initial value and the initial number of cycles into the error correction code (ECC) engine.

8. The method of claim 1, wherein the data source comprises a flash memory.

9. The method of claim 1, wherein the data source comprises a non-volatile memory.

10. The method of claim 1, wherein the data source comprises a communications channel.

11. The method of claim 1, wherein initializing the ECC logic comprises retrieving the selected stage from an initialization register.

12. An error correction code (ECC) engine comprising:
a memory to store a value and a number of cycles related to an intermediate stage; and
error correction code (ECC) logic to process a data block via a plurality of stages including an initial stage and the intermediate stage, the ECC logic to receive payload data from a data source, the ECC logic to read the value and the number of cycles from the memory, the ECC logic to process the payload data starting from the intermediate stage;
wherein the payload data is smaller than the data block by a number of symbols; and
wherein the value and the number of cycles relate to a number of cycles of the ECC logic to process the number of symbols.

13. The system of claim 12, wherein the data source comprises a non-volatile memory.

14. The system of claim 12, wherein the memory comprises an initialization register.

15. The system of claim 12, wherein the intermediate stage is hard coded into the memory.

16. The system of claim 12, wherein the ECC logic includes logic to generate new parity data from the payload data and to compare the new parity data to the parity data from the data source.

17. A method comprising:
receiving payload data and associated parity data from a data source, wherein the payload data has a size that is smaller than a desired size of a data block;
initializing error correction code (ECC) logic to an intermediate state value and an intermediate number of cycles related to a difference between a size of the payload data and the desired size of the data block;
processing the payload data using the ECC logic to produce processed parity data; and
comparing the processed parity data to the associated parity data.

18. The method of claim 17, further comprising:
determining the intermediate state value and the intermediate number of cycles of the ECC logic during a design process, the intermediate state value and the intermediate number of cycles relating to a state of the ECC logic after processing padding data, the padding data corresponding to a number of symbols related to a difference between a size of the payload data and the desired size of the data block; and storing the intermediate state value and the intermediate number of cycles in a memory.

19. The method of claim 18, wherein initializing the ECC logic comprises:

retrieving the intermediate state value and the intermediate number of cycles from the memory; and initializing a state machine of the ECC logic to the intermediate state based on the initial state value and the initial number of cycles.

20. A processor readable storage medium embodying processor readable instructions, that when executed by the processor, cause the processor to perform error detection and correction on payload data using associated parity data, the processor readable instructions comprising:

instructions to initialize error correction code (ECC) logic to an intermediate value and an intermediate number of cycles in response to receiving payload data from a data source, wherein the ECC logic processes a data block of a desired size using a plurality of stages; and instructions to calculate parity data for the payload data using the ECC logic;

wherein the intermediate value and the intermediate number of cycles relate to a state of the ECC logic after processing a number of symbols of padding data related to a difference between the desired size of the data block and a size of the payload data.

21. The processor readable medium of claim 20, wherein the processor readable instructions further comprise instructions to detect and to correct errors in the payload data using the parity data.

22. The processor readable medium of claim 20, wherein the data source comprises a non-volatile memory.

23. The processor readable medium of claim 20, wherein the data source comprises a random access memory (RAM).

24. A method comprising:

receiving payload data at error correct code (ECC) logic adapted to process a data block of a particular number of symbols;

determining a difference between a number of symbols of the payload data and the particular number of symbols of the data block;

selecting an intermediate stage from a plurality of stages, where each stage of the plurality of stages corresponds to a value and a number of cycles of the ECC logic after processing a number of symbols of padding data corresponding to the difference; and processing the payload data using the ECC logic initialized to the selected intermediate stage.

* * * * *